(12) United States Patent
Socheleau et al.

(10) Patent No.: US 12,037,102 B2
(45) Date of Patent: Jul. 16, 2024

(54) SYSTEM FOR CONTROLLING A FLIGHT CONTROL SURFACE

(71) Applicant: Goodrich Actuation Systems SAS, Vernon (FR)

(72) Inventors: Jerome Socheleau, Vernouillet (FR); Wassim Abida, Vernouillet (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 75 days.

(21) Appl. No.: 17/858,224

(22) Filed: Jul. 6, 2022

(65) Prior Publication Data

US 2023/0013360 A1 Jan. 19, 2023

(30) Foreign Application Priority Data

Jul. 19, 2021 (EP) .................................... 21290049

(51) Int. Cl.
*B64C 13/50* (2006.01)

(52) U.S. Cl.
CPC ............ *B64C 13/50* (2013.01); *B64C 13/505* (2018.01)

(58) Field of Classification Search
CPC .............................. B64C 13/50; B64C 13/505
See application file for complete search history.

(56) References Cited

U.S. PATENT DOCUMENTS

| | | |
|---|---|---|
| 6,776,376 B2 | 8/2004 | Collins |
| 8,136,418 B2 | 3/2012 | Behar et al. |
| 2002/0116096 A1 | 8/2002 | Ortega et al. |
| 2019/0233087 A1 | 8/2019 | Avritch et al. |
| 2019/0270511 A1 | 9/2019 | Socheleau et al. |
| 2019/0291850 A1 | 9/2019 | Huynh |
| 2020/0079498 A1* | 3/2020 | Mercier .................. B64C 13/34 |
| 2022/0073192 A1* | 3/2022 | Wang ........................ B64C 9/28 |
| 2022/0227482 A1* | 7/2022 | Yapi ...................... B64C 13/503 |

OTHER PUBLICATIONS

European Search Report for Application No. 21290049.2-1010, mailed Jan. 14, 2022, 9 pages.

\* cited by examiner

*Primary Examiner* — Rodney A Bonnette
(74) *Attorney, Agent, or Firm* — CANTOR COLBURN LLP

(57) ABSTRACT

A system for controlling a flight control surface includes a first electromagnetic actuator "EMA" and a second EMA, each of which are connected to said flight control surface. Each EMA is configured to be arranged in, and switched between, three modes; said three modes comprising: an active mode, a stand-by mode and a blocked, or anti-extension, mode.

12 Claims, 3 Drawing Sheets

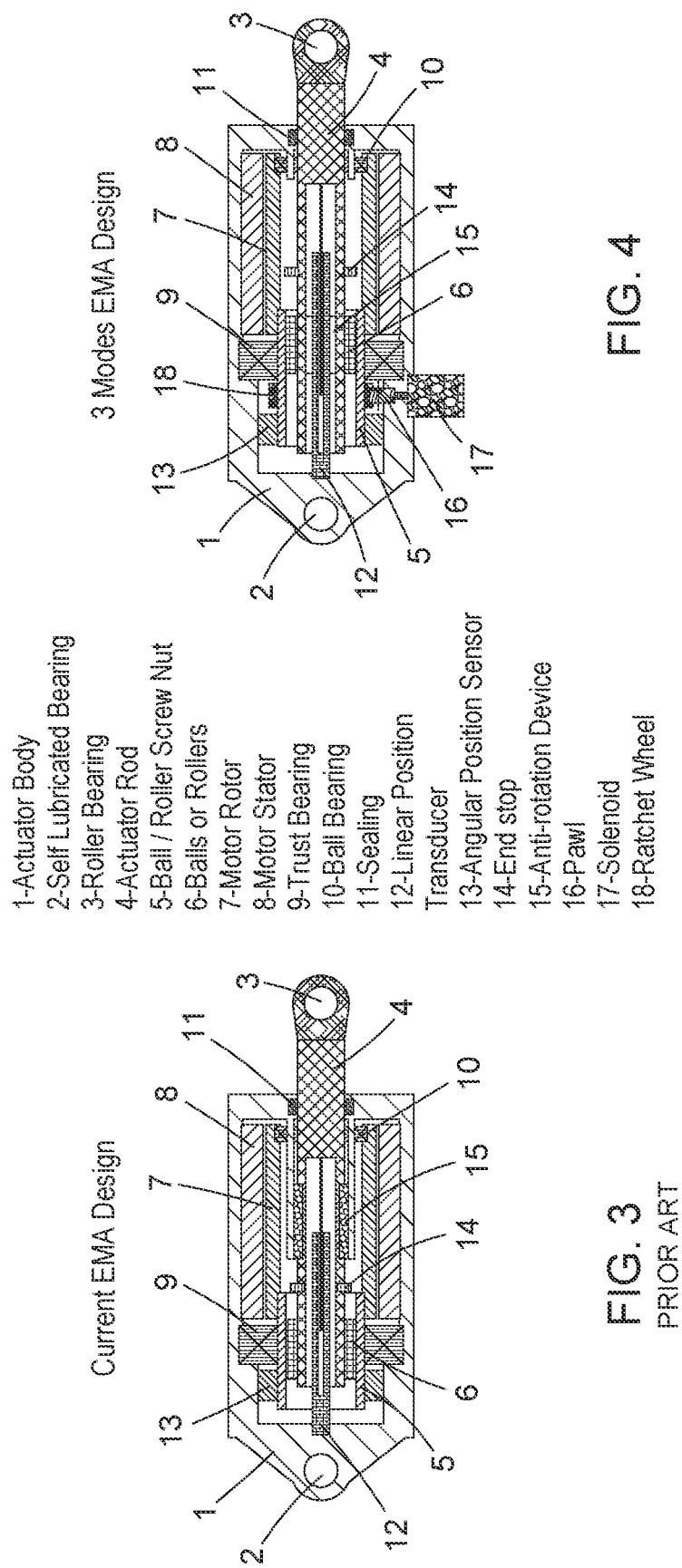

SYSTEM FOR CONTROLLING A FLIGHT CONTROL SURFACE

CROSS REFERENCE TO RELATED APPLICATIONS

This application claims priority to European Patent Application No. 21290049.2 filed Jul. 19, 2021, the entire contents of which is incorporated herein by reference.

FIELD

The examples described herein relate to electromechanical actuators (EMAs).

BACKGROUND

Systems are known for controlling an electromechanical actuator (EMA) of an aircraft. Often these may include a locking device that is configured to mechanically lock the actuator in a first fixed position and to mechanically unlock the actuator from the first fixed position. A controller may be configured to be in communication with both the locking device and the actuator. The controller may monitor a position of the actuator during flight and react when it is detected that the actuator has not moved for a set amount of time.

Some known systems may be operable in fault-tolerant mode to accommodate usual fault situations. In some flight control surface actuation systems, a plurality of actuators may be attached to one or more summing levers, each having an actuator output point that is attached to the flight control surface.

SUMMARY

A system for controlling a flight control surface is described herein, wherein said system comprises: a first electromagnetic actuator (EMA) and a second EMA, each of which are connected to said flight control surface; and wherein each EMA is configured to be arranged in, and switched between, three modes; said three modes comprising: an active mode, a stand-by mode and a blocked, or anti-extension, mode.

In some examples, the system may be configured to be operable in: an active/active mode, wherein both said first and second EMAs are in the active mode; an active/stand-by mode, wherein the first EMA is in the active mode and the second EMA is in the stand-by mode; and a blocked/blocked mode or anti-extension mode, wherein both EMAs are in a blocked, or anti/extension mode.

In some examples said first EMA comprises a first Motor Drive Electronics (MDE) and a first solenoid and said second EMA comprises a second MDE and a second solenoid, and wherein said second MDE of said second EMA is connected to said first solenoid of said first EMA; and wherein said first MDE of said first EMA is connected to said second solenoid of said second EMA.

In some examples, in normal operation, both of the first and second EMAs are operating in said active mode.

In some examples, said first and second EMAs are connected to the flight control surface that is being controlled.

In some examples, the first and second EMAs are each connected to a flight control computer (FCC).

In some examples, in the event of failure of the first EMA, the second EMA is configured to unlock the first EMA by energizing the solenoid of the first EMA, thereby switching said system into said active/standby mode.

In some examples, said first and second EMAs are provided in a housing and wherein, in the event that a temperature of said housing reaches an upper threshold, the system is configured to operate with both the first and the second EMAs in said blocked/blocked mode.

In some examples, in the event that either or both the first and second fail, the system is configured to switch the first and second EMAs into said blocked/blocked mode.

A method for controlling a flight control surface is also described herein, comprising providing a first electromagnetic actuator (EMA) and a second EMA, connected each of said first and second EMAs to said flight control surface; wherein each EMA is configured to be arranged in, and switched between, three modes; said three modes comprising: an active mode, a stand-by mode and a blocked, or anti-extension, mode, said method further comprising: controlling said flight control surface by operating said first and second EMAs in an active/active mode, wherein both said first and second EMAs are in the active mode; an active/stand-by mode, wherein the first EMA is in the active mode and the second EMA is in the stand-by mode; and a blocked/blocked mode or anti-extension mode, wherein both EMAs are in a blocked, or anti/extension mode.

In some examples, said first EMA comprises a first Motor Drive Electronics (MDE) and a first solenoid; and said second EMA comprises a second MDE and a second solenoid, and wherein aid second MDE of said second EMA is connected to said first solenoid (212) of said first EMA; and wherein said first MDE of said first EMA s connected to said second solenoid of said second EMA.

In some examples, the method comprises in normal operation, controlling said flight control surface by operating both of the first and second EMAs in said active mode.

In some examples the method comprises, in the event of failure of the first EMA, operating said flight control surface by the second EMA unlocking, via the first solenoid the first EMA by the second EMA energizing the solenoid of the first EMA, thereby switching said system into said active/standby mode.

In some examples, said first and second EMAs are provided in a housing and in the event that a temperature of said housing reaches an upper threshold, the flight surface is controlled with both the first and the second EMAs in said blocked/blocked mod In some examples, in the event that either or both the first and second EMAs fail, the flight surface is controlled with the first and second EMAs being held in said blocked/blocked mode.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3 illustrates the components of the EMA of a known system such as that shown in FIG. 1.

FIG. 4 illustrates the components of a new type of EMA design such as that used in the system of FIG. 2.

DETAILED DESCRIPTION

The examples described herein relate to electromechanical actuators (EMAs) and, in particular, their use in aileron, elevator or rudder flight control surfaces.

In known systems, such flight control surfaces are driven by two electro hydraulic servo actuators (EHSAs) or by one EHSA in parallel with one electro hydraulic actuator (EHA) that is in an active or damped arrangement. These actuators have two modes, which are active or damped.

The new examples described herein involve using EMA technology to drive flight control surfaces. Due to this, air framers may be forced to switch to an active/active arrangement in order to reduce the actuator size, due to envelope constraints found in thin wing designs.

Figure 1:
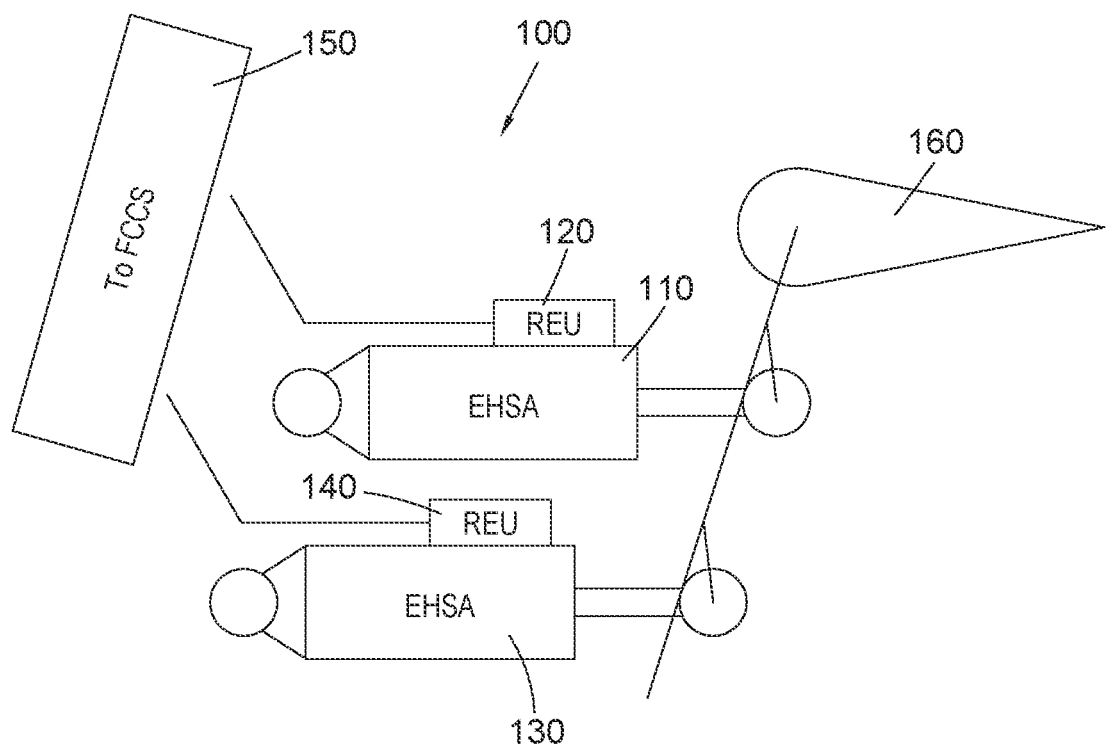
FIG. 1 illustrates a known system for controlling a flight surface.

FIG. 1 depicts a known design 100 for the movement of a flight control surface. The known design comprises a first EHSA 110 and associated Remote Electronic Unit (REU) 20 and a second EHSA 130 and associated REU 140. Each of these REUs 120, 140 are connected to the flight control computers (FCCs) 150 and each of the EHSAs 110, 130 are connected to the flight control surface 160.

As mentioned above, these known systems have EHSs that act in two modes—Active or Damped. In normal operation, one, e.g. the first EHSA 110 is active, controlling the position of the flight control surface 160 and reacting to the full surface hinge moment, while the adjacent, i.e. second EHSA 130 remains in damped mode. In the event of failure of the first EHSA 110, the system switches the first EHSA 110 into the damped mode and the adjacent, or second EHSA 130, switches into active mode. The system then operates as previously.

In the event that both EHSAs 110, 130, fail, the two actuators switch into the damped mode. This means that the surface 160 is no longer controlled in position and this in turn generates aerodynamic drag.

In addition to this, this electric system architecture (which is replicating the conventional hydraulic system architecture) leads to a very bulky EMA system which is sized to react to the full surface hinge moment and the drag generated by the motion of the adjacent actuator in damped mode. Such systems are twice as large as their equivalent EHSA and need to dissipate locally the heat generated (copper losses) by reacting external loads.

Figure 2:
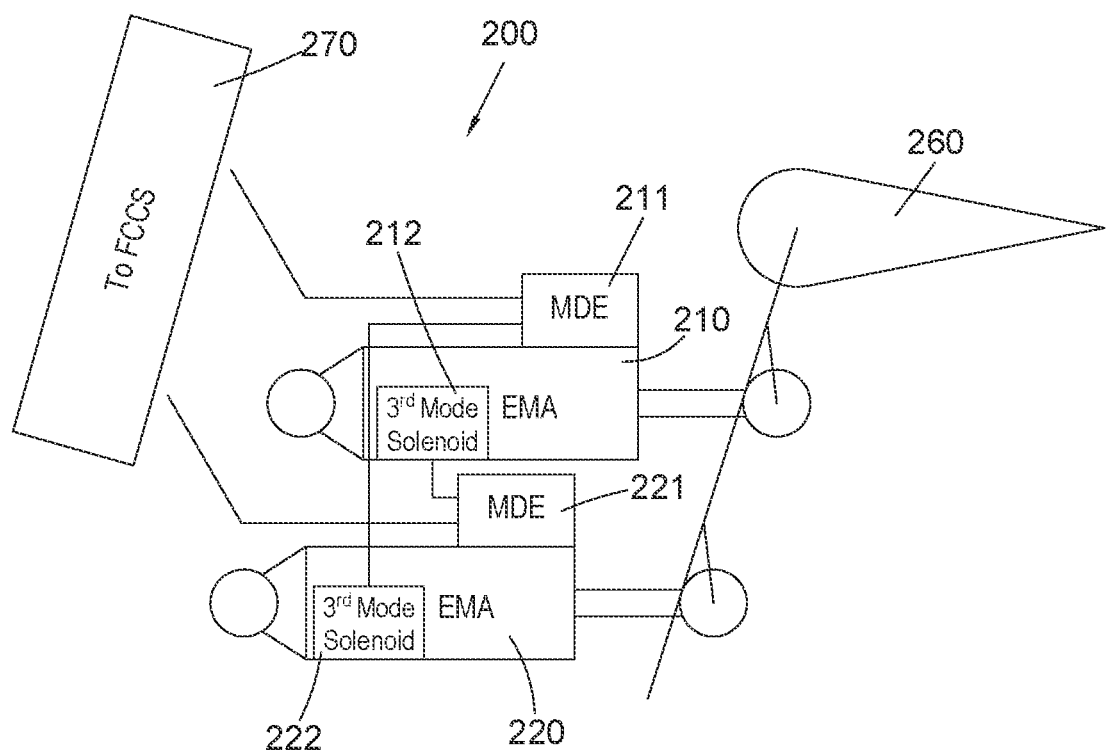
FIG. 2 illustrates an example of a new system for controlling a flight surface, as described herein.

The new examples described herein and with reference to FIGS. 2 to 4 allow the EMAs to introduce a third mode, which is an anti-extension, or blocked, mode into the EMA design. This third, anti-extensions or blocked mode is controlled in use by the adjacent actuator.

The new examples described herein improve the remaining thermal management in case of an adjacent EMA failure, which will react to a surface full hinge moment. They also reduce aerodynamic drag in case of a dual EMA failure (such that there is no free float).

In contrast to this known arrangement, a new example of a new type of system 200 for controlling a flight surface 260 is shown in FIG. 2. As can be seen in this figure, a first EMA 210 is provided which comprises an associated first Motor Drive Electronics (MDE) 211 and a first solenoid 212. The system further comprises a second EMA 220 which comprises an associated second MDE 221 and a second solenoid 222.

As can be seen in FIG. 2, each of the first and second EMAs 210, 220 are connected to the flight control surface 260. The first and second EMAs 210, 220 as well as their associated MDEs 211, 221 are each connected to the flight control computers (FCCs) 270. Usually there are several FCCs 270 in a primary control system and two adjacent actuators are controlled by a different FCC to avoid common mode failures. The FCCs may be considered to correspond to the "brain" of the system (i.e., the master), whereas the MDEs/actuators (EMAs) are the slaves in that they respond to the orders sent from the FCCs and report the EMA health status.

The first solenoid 212 of the first EMA 210 is further connected to the second MDE 221 of the second EMA 220 and the second solenoid 222 of the second EMA 220 is connected to the first MDE 211 of the first EMA 210. Due to this arrangement, the solenoid 212, 222 of each EMA 210, 220 can be activated by the adjacent EMA 210, 220 (in this example, via the MDE of the adjacent EMA).

This new system is able to work in three modes, i.e. in 1) an active/active mode, wherein both the EMAs 210, 220 are in the active mode, 2) an active/stand-by mode, wherein one of the EMAs 210, 220 is in the active mode and the other is in the stand-by mode, or 3) a blocked/blocked mode, wherein both the EMAs 210, 220 are in the blocked mode. In some examples, the blocked mode can be replaced with an anti-extension mode if required (e.g. for an aileron application).

In the Active/Active mode, both EMAs 210, 220 are electrically supplied by aircraft high and low power networks. Both EMAs 210, 220 receive a signal from the FCCs to switch into the active mode (each MDE activates its own EMA solenoid and adjacent EMA solenoid). Both EMAs 210, 220 receive the same position order from the FCCs to control the flight control surface position. The EMAs may exchange information in order to alleviate the force flight generated between the two actuators connected to the same surface (the force fight is usually generated by the control loop difference/error between the two channels through surface structural stiffness).

In the Active/Stand-by mode, at least one EMA 210, 220 is electrically supplied by aircraft high and low power networks. The adjacent EMA 210, 220 may or may not be electrically supplied by aircraft high and low power networks, that is, it can be alive and functioning normally, or failed, the same goes for its FCC. The EMA 210, 220 which is electrically supplied also receives a signal from its FCC to switch into the active mode (the MDE activates its own EMA solenoid and adjacent EMA solenoid). The EMA 210, 220 which is electrically supplied also receives a position order from its FCC to control the flight control surface position. The Adjacent EMA 210, 220 which is still connected to the flight control surface is back driven by the active EMA 210, 220.

In the blocked/blocked mode, both EMAs may be, or may not be, electrically supplied by aircraft high and low power networks. Both EMAs may or may not receive a signal from FCCs to switch into the blocked mode (when not electrically energized, the solenoids switch naturally into the blocked mode). The flight control surface is blocked in a given position.

The functioning of this 3 mode EMA will now be described in detail. As mentioned above, the three modes in which each of the individual EMAs operate are Active, Stand-by or Blocked. In normal system operation, both of the first and second EMAs 210, 220 are operating in the active mode, controlling the position of the flight control surface 260 and reacting to each half of the surface hinge moment (i.e. the system is in the active/active mode).

In the event of failure, for example, of the first EMA 210, the adjacent, second EMA 220 (which is still operating normally in the active mode) is configured to unlock the failed, first EMA 210 by energizing the solenoid 212 of the first EMA 210. The system is therefore now in an active/stand-by configuration. The remaining active EMA, i.e. the second EMA 220, then controls the surface position and reacts electromagnetically to the full surface hinge moment.

Both EMAs 210, 220 may be positioned within a housing (not shown). In the event that the housing temperature reaches a specified upper limit, both the first and the second EMAs 210, 220 can be switched into blocking mode (i.e. the blocked/blocked mode). The flight control surface 260 is then in a blocked position and the surface hinge moment is reacted mechanically by the first and second EMAs 210, 220.

The EMA that has not failed can then cool down and when the EMA housing temperature reaches a given lower value or threshold, the system can be reconfigured into the Active/stand-by arrangement.

In the event that either or both of the first and second EMAs 210, 220 fail, the first and second actuators are switched into blocked mode, thereby avoiding surface free float and associated drag penalty.

The architecture of the new systems described herein and depicted in FIG. 2 reduces the size of the EMA for thin wing applications. The EMA system can be sized for only a percentage of the full hinge moment (higher than 50%) and does not generate any damping in case of failure.

FIG. 3 shows the components of a current EMA design. The current EMA design comprises an actuator body 1, having an attachment bearing 2 at a first longitudinal end and a roller bearing 3 at the opposite longitudinal end. The roller bearing 3 is connected to the actuator rod 4, which in turn is connected to a linear position transducer 12. A sealing system 11 is provided between the actuator rod 4 and the actuator body 1. A motor stator 8 internal to the actuator body 1 and a motor rotor 7 provide torque to a ball or a roller screw nut 5 which interacts with balls or rollers 6 which are positioned externally to the actuator rod 4. A linear position transducer 12 provides actuator rod 4 position to the actuator control electronic. A trust bearing 9 is provided externally to the ball or roller screw nut 6. An angular position sensor 13 is provided to measure the angle of the rotor of the electric motor. An end stop 14 is provided to limit the movement of the actuator rod 4, as well as an anti-rotation device 15 which prevents rotation of the actuator rod 4. A ball bearing 10 is also provided around the actuator rod 4 to guide the motor rotor 7.

FIG. 4 shows the inner workings of new EMA design that can be used in the system 200 shown in FIG. 2, which has many of the same features as that shown in FIG. 3, but additionally has a pawl 16, a solenoid 17 and a ratchet wheel 18. This allows the EMA to work in three modes with an anti-extension device as described above with reference to FIG. 2. When the solenoid 17 is energized, it disengages the pawl 16 from the ratchet wheel 18 and thus enabling the ball screw or roller screw nut 5 to rotate and the actuator rod 4 to translate in both directions under external load application. When the solenoid 17 is de-energized, the pawl 16 engages into a teeth of the ratchet wheel 18 and prevents the rotation of the ball or roller screw nut 5 and the translation of the actuator rod 4 in the extension direction.

Although the example shown here in FIG. 4 has a direct drive EMA architecture (i.e. there is no gearbox), this could be replaced by a geared drive EMA architecture, with a gearbox being positioned between the electric motor and the ball/roller screw.

The linear EMA could also/alternatively be replaced by a rotary EMA using a gearbox and an output lever connected to the rotary output of the gearbox.

The anti-extension (unidirectional blocking) mode could also be replaced by a blocked mode (bi-directional). The ratchet wheel and the pawl could alternatively/also be replaced by a unidirectional free wheel (anti-extension mode) or by friction discs (a stator and a rotor driven by a solenoid) for the blocked mode configuration.

The invention claimed is:

1. A system for controlling a flight control surface, wherein said system comprises:
   a first electromagnetic actuator (EMA) and a second EMA, each of which are connected to said flight control surface;
   and wherein each EMA is configured to be arranged in, and switched between, three modes;
   said three modes comprising:
   an active mode, a stand-by mode and a blocked, or anti-extension, mode
   wherein:
   said first EMA comprises a first Motor Drive Electronics (MDE) and a first solenoid; and
   said second EMA comprises a second MDE and a second solenoid;
   said second MDE of said second EMA is connected to said first solenoid of said first EMA;
   said first MDE of said first EMA is connected to said second solenoid of said second EMA; and
   in the event of failure of the first EMA, the second EMA is configured to unlock the first EMA by energizing the solenoid of the first EMA, thereby switching said system into said active/standby mode.

2. The system of claim 1,
   wherein the system is configured to be operable in and switchable between:
   an active/active mode, wherein both said first and second EMAs are in the active mode;
   an active/stand-by mode, wherein the first EMA is in the active mode and the second EMA is in the stand-by mode; and
   a blocked/blocked mode or anti-extension mode, wherein both EMAs are in a blocked, or anti/extension mode.

3. The system of claim 1, wherein, in normal operation, both of the first and second EMAs are operating in said active mode.

4. The system of claim 1, wherein said first and second EMAs are connected to the flight control surface that is being controlled.

5. The system of claim 1, wherein the first and second EMAs are each connected to a flight control computer (FCC).

6. The system of claim 1, said first and second EMAs are provided in a housing and wherein, in the event that a temperature of said housing reaches an upper threshold, the system is configured to operate with both the first and the second EMAs in said blocked/blocked mode.

7. The system of claim 1, wherein, in the event that either or both the first and second EMAs fail, the system is configured to switch the first and second EMAs into said blocked/blocked mode.

8. A method for controlling a flight control surface, comprising:

providing a first electromagnetic actuator (EMA) and a second EMA;

connecting each of said first and second EMAs to said flight control surface;

wherein each EMA is configured to be arranged in, and switched between, three modes; said three modes comprising: an active mode, a stand-by mode and a blocked, or anti-extension, mode, the method further comprising:

controlling said flight control surface by switching between and operating said EMAs in an active/active mode, wherein both said first and second EMAs are in the active mode;

an active/stand-by mode, wherein the first EMA is in the active mode and the second EMA is in the stand-by mode; and a blocked/blocked mode or anti-extension mode, wherein both EMAs are in a blocked, or anti/extension mode; and in the event of failure of the first EMA, operating said flight control surface by the second EMA unlocking, via the first solenoid the first EMA due to the second EMA energizing the solenoid of the first EMA, thereby switching said system into said active/standby mode.

9. The method of claim 8, wherein said first EMA comprises a first Motor Drive Electronics (MDE) and a first solenoid; and said second EMA comprises a second MDE and a second solenoid, and wherein said second MDE of said second EMA is connected to said first solenoid of said first EMA;

and wherein said first MDE of said first EMA is connected to said second solenoid of said second EMA.

10. The method of claim 8, comprising, in normal operation, controlling said flight control surface by operating both of the first and second EMAs in said active mode.

11. The method of claim 8, wherein, said first and second EMAs are provided in a housing and wherein, in the event that a temperature of said housing reaches an upper threshold, controlling the flight surface with both the first and the second EMAs in said blocked/blocked mode.

12. The method of claim 8, wherein, in the event that either or both the first and second EMAs fail, controlling the flight surface with the first and second EMAs being held in said blocked/blocked mode.

* * * * *